(12) United States Patent
Omura et al.

(10) Patent No.: US 7,584,148 B2
(45) Date of Patent: Sep. 1, 2009

(54) APPARATUS AND METHOD FOR PROCESSING A CHECK, AND A COMPUTER-READABLE RECORDING MEDIUM STORING A CHECK PROCESSING CONTROL PROGRAM

(75) Inventors: Kunio Omura, Shiojiri (JP); Naoki Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1319 days.

(21) Appl. No.: 10/293,586

(22) Filed: Nov. 13, 2002

(65) Prior Publication Data

US 2003/0126082 A1    Jul. 3, 2003

(30) Foreign Application Priority Data

Nov. 16, 2001  (JP) .............................. 2001-352179
Nov. 16, 2001  (JP) .............................. 2001-352180

(51) Int. Cl.
    *G06O 40/00*    (2006.01)
(52) U.S. Cl. ........................ 705/45; 235/379; 382/251; 382/260; 382/56; 382/304; 382/232
(58) Field of Classification Search ................... 705/35, 705/45; 382/251, 260, 56, 304, 232, 169; 235/379
    See application file for complete search history.

(56) References Cited

U.S. PATENT DOCUMENTS

| | | | |
|---|---|---|---|
| 4,686,357 A | 8/1987 | Douno et al. | |
| 4,888,812 A | 12/1989 | Dinan et al. | |
| 4,924,521 A | 5/1990 | Dinan et al. | |
| 5,056,154 A | 10/1991 | Aono et al. | |
| 5,339,368 A * | 8/1994 | Higgins-Luthman et al. | 382/169 |
| 5,631,984 A | 5/1997 | Graf et al. | |
| 5,768,446 A * | 6/1998 | Reasoner et al. | 382/304 |
| 5,832,463 A * | 11/1998 | Funk | 705/35 |
| 5,848,192 A * | 12/1998 | Smith et al. | 382/232 |
| 5,905,817 A * | 5/1999 | Matama | 382/260 |
| 6,283,366 B1* | 9/2001 | Hills et al. | 235/379 |
| 6,606,418 B2* | 8/2003 | Mitchell et al. | 382/251 |
| 6,647,376 B1* | 11/2003 | Farrar et al. | 705/45 |
| 6,700,684 B1 | 3/2004 | Chiba et al. | |
| 6,961,460 B2 | 11/2005 | Nagai et al. | |
| 2005/0231608 A1 | 10/2005 | Nagai et al. | |

FOREIGN PATENT DOCUMENTS

EP    0 616 296    9/1994

(Continued)

*Primary Examiner*—Ella Colbert
*Assistant Examiner*—Samica L Norman

(57) ABSTRACT

A check processing method involves capturing at a first compression rate certain portions of a received check, and evaluating, based on that captured image data, whether certain information of the check can be reproduced by image data at a second compression rate that is greater than the first compression rate. If so, then image data representing the subject portions of the check is captured at the second compression rate image data, stored, and used to electronically process a corresponding check payment transaction. If not, then a specific process is executed without using image data at the second compression rate. This processing step outputs a specific signal or stores image data containing representing the subject portions of the received check at the first compression rate. Such process may be embodied in a check processing apparatus and may be carried out in response to a program of instructions.

29 Claims, 12 Drawing Sheets

FOREIGN PATENT DOCUMENTS

| | | |
|---|---|---|
| EP | 0 658 042 | 6/1995 |
| JP | 6134689 | 2/1986 |
| JP | 62297981 | 12/1987 |
| JP | 1171069 | 7/1989 |
| JP | 1-191976 | 8/1989 |
| JP | 01252067 | 10/1989 |
| JP | 2-126772 | 5/1990 |
| JP | 4-190452 | 7/1992 |
| JP | 4-314170 | 11/1992 |
| JP | 05176173 | 7/1993 |
| JP | 7-110841 | 4/1995 |
| JP | 7-200720 | 8/1995 |
| JP | 7-244702 | 9/1995 |
| JP | 09182093 | 7/1997 |
| JP | 10-105621 | 4/1998 |
| JP | 10149441 | 6/1998 |
| JP | 11215375 | 8/1998 |
| JP | 2001-134702 | 5/2001 |
| JP | 2001245177 | 9/2001 |

* cited by examiner

APPARATUS AND METHOD FOR PROCESSING A CHECK, AND A COMPUTER-READABLE RECORDING MEDIUM STORING A CHECK PROCESSING CONTROL PROGRAM

BACKGROUND OF THE INVENTION

1. Field of the Invention

The present invention relates to a method and an apparatus for processing checks when settling a payment by check, and to a computer-readable recording medium storing a control program for implementing the check processing method.

2. Description of the Related Art

When a check is used to pay for a purchase in a store, the store receives the check from the customer and typically confirms the validity of the check. If the check is valid, the payment information is printed on the check front and endorsement information is printed on the back of the check as required, and the check is then submitted to the issuing bank or clearing house for payment. Based on the information included on the check, the clearinghouse transfers funds from the account of the payer (check issuer) to the account of the payee (check recipient) to complete payment. Conventional check-based payments are thus completed by delivering the physical check from the store to the payment organization.

Electronic payment processing using checks has also progressed in recent years. This involves reading the account number and other data written or printed on the check at a checkout terminal in a store, and transmitting this data electronically to a server in the payment organization for processing. Electronically processing check payments thus improves efficiency because it is not necessary to physically deliver the check to the payment organization. Because it is not necessary to deliver the check to the payment organization, the check can be returned directly to the customer at the point of sale.

However, if the check used for payment is returned to the customer without keeping a record of the check, the store has no proof that goods were purchased using a check. This can lead to problems between the store and customer, such as disagreement over the amount paid and whether goods were purchased or not, and it can be difficult to satisfactorily reconcile these problems. This problem is conventionally resolved by the store scanning the check used for payment and keeping the scanned check image as proof of electronically processed check payments.

Checks are typically scanned at a relatively high resolution, normally 8-bit (256 gradation levels), and each image is therefore large in terms of required storage space. Furthermore, the store must archive the images of checks written by numerous customers for a considerable time, thus increasing the number of check images that must be stored. If the images are stored at the same number of gray levels used for scanning, the capacity of the storage device required to store the image will balloon and considerable time will be required to transmit the check images.

These problems can be avoided in part by converting the images to binary (1-bit) image data to compress the image data before storage. However, in order for the stored image data to be used as proof of a purchase by check, the check number recorded on the check, the signature of the payer (account holder), the amount, and other information must be shown in the image data. A wide range of background images are also used on the checks, and if the check background is dark or the ink used for the signature is light some of this required information could be confused with the background. This information could then be lost when the check image is converted to binary image data, making the binary check image no longer useful as proof that a purchase was made with the check.

OBJECTS AND SUMMARY OF THE INVENTION

An object of the present invention is therefore to overcome the aforementioned problems.

It is another object of this invention to prevent the loss of necessary information from check image data compressed for storage.

According to one aspect of the invention, a method for processing a check payment transaction is provided. Such method comprises capturing at a first compression rate image data representing at least specific parts of a check received from a customer; and evaluating, based on the image data captured at the first compression rate, whether information contained in the specific parts of the check can be reproduced by image data at a second compression rate that is greater than the first compression rate. If so, the method further involves capturing at the second compression rate image data representing at least the specific parts of the check, storing the check image data captured at the second compression rate, and electronically processing the check payment transaction using the check image data captured at the second compression rate. If the result of the evaluation step is "no," then the method further involves processing the check payment transaction without using check image data captured at the second compression rate.

A further check processing method according to another aspect of includes capturing at a first compression rate image data representing at least specific parts of a check received from a customer; and evaluating, based on the image data captured at the first compression rate, whether information contained in the specific parts of the check can be reproduced by image data at a second compression rate that is greater than the first compression rate. Then, one of the following is performed: (1) capturing at the second compression rate image data representing at least the specific parts of the check if it is determined by the evaluating step that the information contained in the specific parts of the check is reproducible at the second compression rate, and then storing the check image data captured at the second compression rate for processing the check payment transaction electronically; or (2) storing the check image data captured at the first compression rate image data for processing the check payment transaction electronically.

In accordance with another aspect of the invention, an apparatus for processing a check is provided. Such apparatus comprises an image data capturing unit configured to scan a check inserted in the apparatus and to capture image data of a scanned check at a first compression rate and at a second compression rate that is greater than the first compression rate; an evaluation unit configured to determine, based on the check image data captured at the first compression rate whether information contained in specific parts of the check is reproducible by image data at the second compression rate; and a storage unit configured to store check image data captured at the second compression rate. The check image data is captured at the second compression rate, stored in the storage unit, and used for processing a payment transaction in connection with the check only if the evaluation unit determines that the information contained in the specific parts of the check is reproducible by image data at the second compression rate; otherwise, the payment transaction is processed without check image data captured at the second compression rate.

Preferably, this check processing apparatus also has a check transportation unit for ejecting the check from the apparatus without obtaining image data at the second compression rate when the evaluation unit determines the information in the specific parts of the check is not reproducible.

Yet further preferably, the check processing apparatus also has a notification unit for informing the operator when the evaluation unit determines that the subject information is not reproducible.

Yet further preferably, the check processing apparatus also has a storage unit for storing image data at the first compression rate when the subject information is determined to be not reproducible by the evaluation unit.

According to another aspect of the invention, a check processing method for processing checks using a check processing apparatus is provided. Such method comprises sending to the check processing apparatus a command for capturing at a first compression rate image data representing at least specific parts of a check received from a customer; and receiving from the check processing apparatus a result indicating whether or not information contained in the specific parts of the check can be reproduced by image data at a second compression rate that is greater than the first compression rate. If the received result indicates that that the information in the specific parts of the check can be reproduced by image data at the second compression rate, then the method further involves sending to the check processing apparatus a command for capturing at a second compression rate image data representing at least the specific parts of the check image data, receiving from the check processing apparatus check image data captured at the second compression rate, and storing the image data captured at the second compression rate. However, if the received result indicates that that the information in the specific parts of the check cannot be reproduced by image data at the second compression rate, then the method further involves sending to the check processing apparatus a command to eject the check without capturing check image data at the second compression rate.

In accordance with still another aspect of the invention a device-readable medium contains a program (e.g., software) for directing the performance of a check processing method as described herein. The program, which comprises computer-readable instructions, is stored on or conveyed to a computer that is embodied in, or in communication with, a check processing apparatus for capturing check images. The medium may include any known device on which software may be stored including electromagnetic carrier waves. Such a program may comprise instructions for capturing at a first compression rate image data representing at least specific parts of a check received from a customer; determining whether or not information contained in the specific parts of the check can be reproduced by image data at a second compression rate that is greater than the first compression rate; capturing at a second compression rate image data representing at least the specific parts of the check image data, obtaining from the check processing apparatus check image data captured at the second compression rate, and storing the image data captured at the second compression rate, if the received result indicates that that the information in the specific parts of the check can be reproduced by image data at the second compression rate; and ejecting the check without capturing check image data at the second compression rate, if the received result indicates that that the information in the specific parts of the check cannot be reproduced by image data at the second compression rate.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
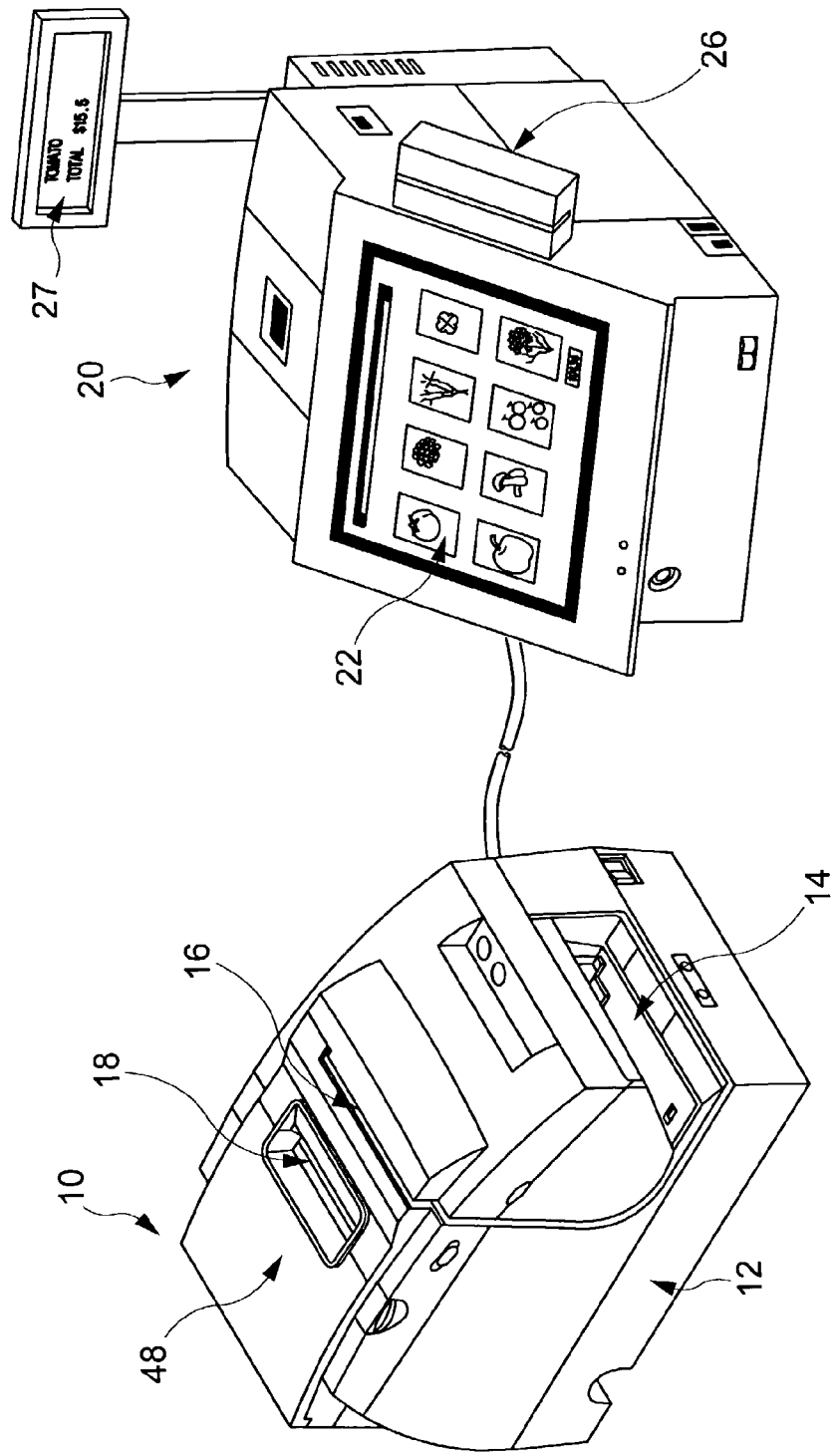
FIG. 1 is an overview of a check processing system according to a first embodiment of the present invention.
Figure 2:
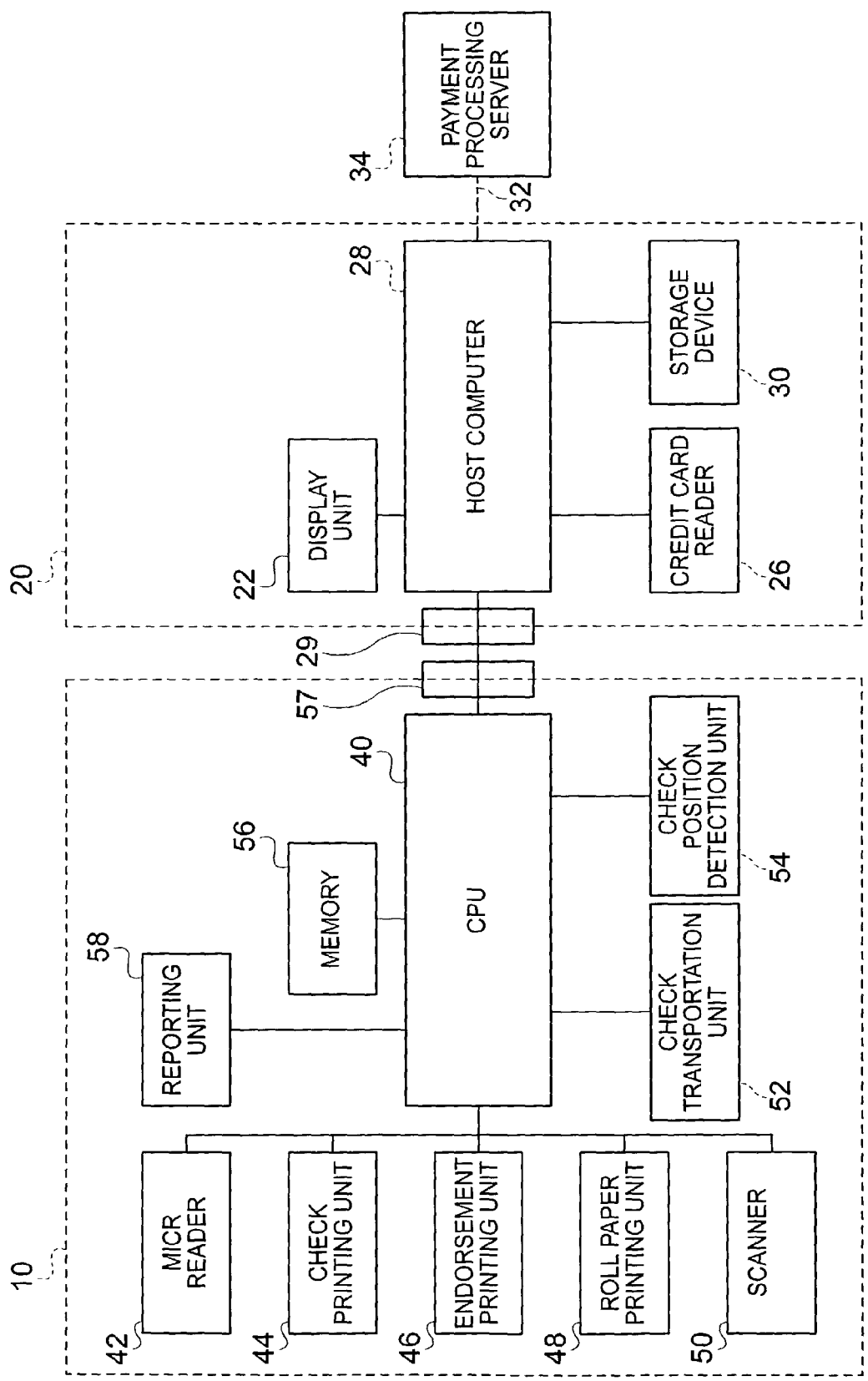
FIG. 2 is a block diagram of a check processing system according to embodiments of the present invention.

FIG. 1 is an overview and FIG. 2 is a block diagram of a check processing system according to a first embodiment of the present invention. As will be known from these figures, a check processing system according to this first embodiment of the invention includes a check processing unit 10 and a cash register 20 installed at the checkout counter of a store, for example. The check processing unit 10 and cash register 20 are in communication with each other.

As shown in FIG. 1 the check processing unit 10 has a cover 12 that is typically made of plastic. An insertion opening 14 for inserting a check is disposed at the front of the cover 12, and an exit opening 16 from which the check is ejected is disposed in the top of the cover 12. A roll paper exit opening 18 is also provided in the top back part of the check processing unit 10. Roll paper that is stored in a roll paper housing (not shown in the figure) and printed by the roll paper printing unit 48 (further described below) is ejected through the roll paper exit opening 18.

The cash register 20 has a touch-panel display unit 22, credit/debit card reader 26, and customer display 27.

As shown in FIG. 2 the check processing unit 10 has a central processing unit (CPU) 40. The cash register 20 has a host computer 28 and storage device 30. The CPU 40 of the check processing unit 10 and the host computer 28 of the cash register 20 communicate with each other by means of a wireless or wired connection through interfaces 57 and 29 to exchange data.

The display unit 22, credit/debit card reader 26, and storage device 30 of the cash register 20 are connected to the host computer 28. The host computer 28 is, in turn, connected through communication line 32 to the payment processing server 34 of a payment organization.

It should be noted that the payment organization could be a check clearing house (an organization that processes payments through banks or other financial organizations on behalf of stores, for example) or it could be a bank or other financial organization. The payment organization performs a validation function for determining whether a check is valid based on the account number, for example, of the payer, and performs a payment function for effecting a transfer of funds based on the check. The clearing house may be authorized only to determine check validity and thus not have the ability to process payments. In this case inquiries regarding check validity are sent to the clearing house while payment instructions are sent to the financial institution (or a clearing house with a payment processing capability). The present embodiment is described using by way of example a payment organization having both check validation and payment processing functions.

As shown in FIG. 2 the check processing unit 10 also has connected to the CPU 40 a MICR reader 42, check printing unit 44, endorsement printing unit 46, roll paper printing unit 48, scanner 50, check transportation unit 52, check position detection unit 54, memory 56 such as ROM or RAM, interface 57, and reporting unit 58.

The MICR reader 42 has a magnetic ink character recognition (MICR) function for reading magnetic ink characters printed on the check front. As further described below, data read by the MICR reader 42 is sent through interface 57 to the host computer 28 in response to a command from the CPU 40. Based on the data read by the MICR reader 42, the host computer 28 sends a check validation request to the payment processing server 34.

Figure 3:
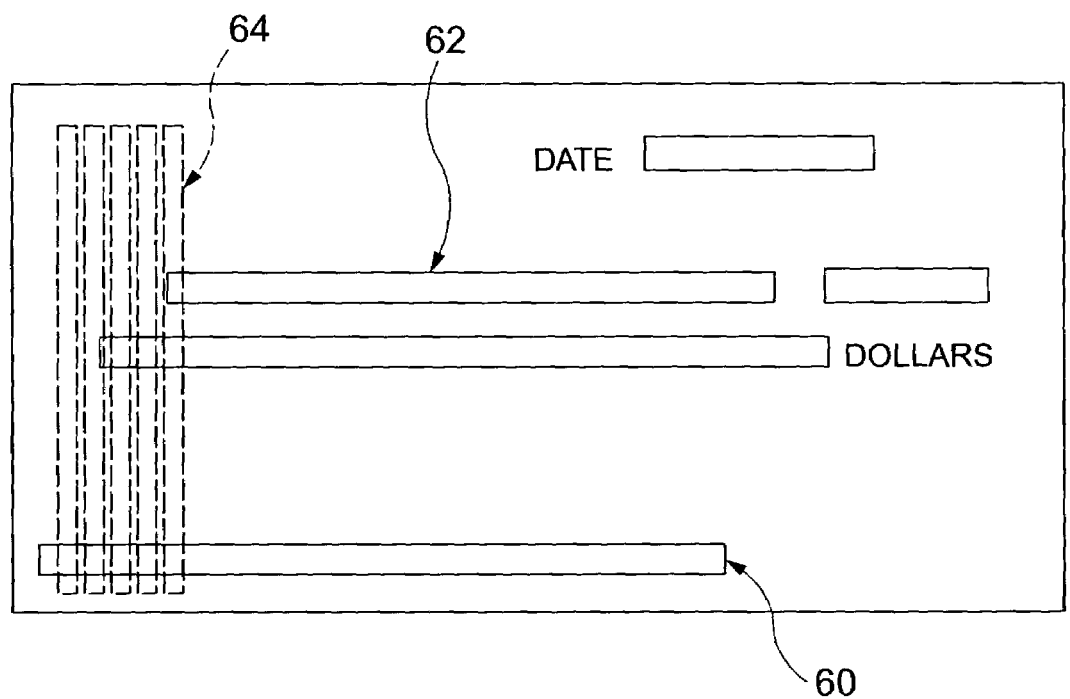
FIG. 3 is a schematic view of a typical check processed by a check processing apparatus.

FIG. 3 is a plan view showing the front of a typical check processed by a check processing unit 10 according to the present embodiment of the invention. Magnetic ink characters are recorded in the MICR recording area 60 on the front of the check as shown in FIG. 3, and include the payer account number of the check. It should be noted that this account number is a number uniquely identifying a specific account, and is an individual account number including the bank code, branch code, or other routing information.

The check printing unit 44 and endorsement printing unit 46 include a dot impact print head or other suitable print head. The check printing unit 44 prints the check face items including the payee, date, payment amount, and any other payment information to the check front as instructed by the CPU 40. The endorsement printing unit 46 prints endorsement information including the check verification number, date, payment amount, and other information required by the payee in the endorsement area on the back of the check as instructed by the CPU 40. The check face items are printed to the face item printing area 62 shown in FIG. 3, and the endorsement items are printed to the endorsement area 64 on the back of the check.

The roll paper printing unit 48 has a thermal print head or other appropriate type of print head for printing a check processing agreement for electronic processing of the check, a receipt, coupons, or other information to roll paper pulled out from the roll paper compartment, and then cuts the printed roll paper with an automatic paper cutter (not shown in the figure) as instructed by the CPU 40.

The scanner 50 has a contact image sensor or other appropriate type of image sensor, scans the check face as instructed by the CPU 40, and stores the captured image temporarily to memory 56 (RAM). In this embodiment of the invention the pixels of the image data output by the scanner 50 are 8-bits deep, producing a 256-level (0 to 255) gray scale image.

The check transportation unit 52 transports the check along the transportation path, and includes multiple sets of transportation rollers and roller drive parts.

The check position detection unit 54 detections the location of the check in the transportation path, and supplies signals to the CPU 40 indicating when the check reaches specific positions, that is, a position indicating the check has been inserted a specific distance from the insertion opening 14, the printing start positions of the check printing unit 44 and endorsement printing unit 46, the reading start position of the MICR reader 42, and the scanning start position and the pre-scanning start position of the scanner 50.

The reporting unit 58 consists of LEDs, an LCD or other type of display panel, a buzzer, or other means for visually or audibly reporting the current printer status to the user.

The process run in this embodiment of the invention is described next.

Figure 4:
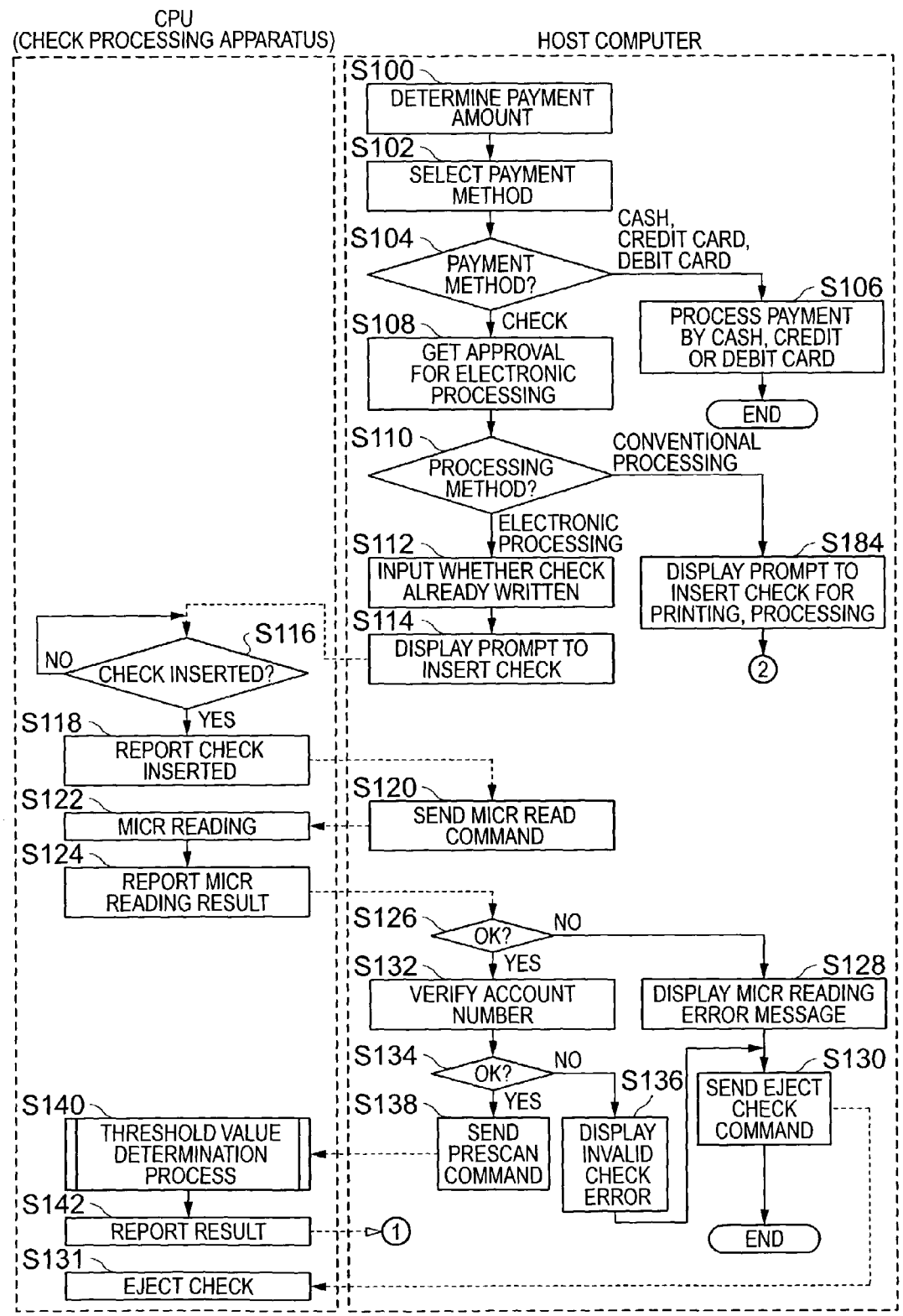
FIG. 4 is a first flow chart showing the process run in accordance with a first embodiment of the invention.
Figure 5:
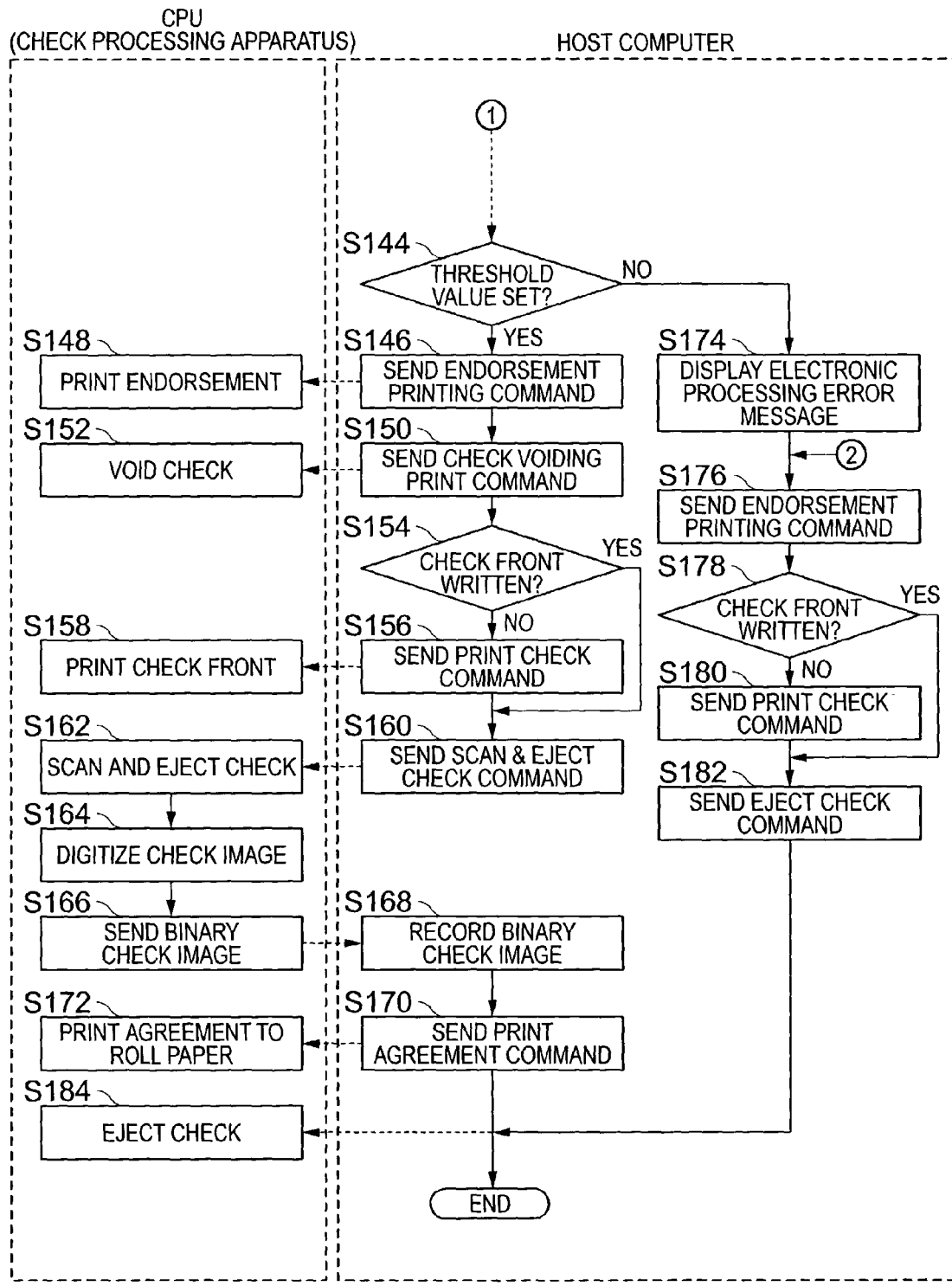
FIG. 5 is a second flow chart showing the process run in accordance with a first embodiment of the invention.

FIG. 4 and FIG. 5 are flow charts showing the overall flow of the check processing operation run by this embodiment of the invention. The process shown in FIG. 4 and FIG. 5 is executed by the CPU 40 and host computer 28 reading and executing a program stored in a storage device such as memory 56 and storage device 30. That is, functions that are characteristic of the present invention, including capturing image data at a first compression rate by scanning the check with the scanner 50 and further obtaining image data at a second compression rate higher than the first compression rate, and determining based on the image data captured at the first compression rate whether information presented in specific parts of the captured check image can be presented in the image data at the second compression rate, are achieved by the CPU executing firmware stored in ROM.

As shown in FIG. 4, at the end of the customer checkout process completed at the cash register, the payment amount for that customer is calculated by the host computer 28 (S100). A selection screen is then presented on the display unit 22 or selecting the payment method, i.e., cash, credit card, debit card, or check (S102). The payment method selected from this screen is then detected (S104). If cash or credit or debit card is selected, payment is processed using cash or the selected card (S106) and the payment process ends.

However, if payment by check is selected, a confirmation screen for confirming whether electronic processing of the check payment is acceptable is presented on the display unit 22 (S108). If the checkout clerk obtains customer approval to electronically process the check payment, the clerk presses a "confirm" button on the confirmation screen. If approval is not received, a "conventional processing" button is pressed. The host computer 28 then determines which button was pressed on the confirmation screen (S110). If the "confirm" button was pressed a screen for indicating whether or not the check was already written, i.e., whether the check face items have been filled in, is presented (S112). This indication of whether the check has been written or not is used later to determine whether the check processing unit 10 needs to print the face items. The process run when "conventional processing" is selected is further below described.

Once the operator indicates whether the check has been written, a message prompting the operator to insert the check is displayed (S114). The operator then inserts the check received from the customer to the insertion opening 14 of the check processing unit 10 and the CPU 40 of the check processing unit 10 determines if the check has been inserted based on the detection signal from the check position detection unit 54 (S116). When check insertion is detected the CPU 40 outputs a signal to that effect to the host computer 28 (S118). This signal causes the host computer 28 to send a command to the CPU 40 for reading the magnetic ink characters on the check (S120).

This command causes the CPU 40 to drive the check transportation unit 52 to advance the check to the MICR reading position of the MICR reader 42, and then drive the MICR reader 42 to read the magnetic ink characters (S122). If the magnetic ink characters are successfully read, the captured account number and other information is sent as the reading result to the host computer 28; if reading the magnetic ink characters fails, a corresponding error signal is sent to the host computer 28 (S124).

Based on the result sent from the CPU 40, the host computer 28 determines whether MICR reading was successful (S126). If reading failed, a message telling the operator that MICR reading was unsuccessful is displayed (S128), a signal is sent to the CPU 40 to eject the check (S130), and processing ends. If the CPU 40 receives this check ejection signal it drives the check transportation unit 52 to eject the check from exit opening 16 (S131). Check processing is thus prevented from continuing if an invalid check without magnetic ink characters (or a piece of paper other than a check) is inserted, or if the check is inserted backwards, for example.

If the magnetic ink characters were read, the host computer 28 asks the payment processing server 34 if the account number in the captured MICR data is correct (that is, if an account of that account number exists) (S132, S134). If the account number is incorrect, a message that the check cannot be processed is displayed (S136), a check ejection command is sent to the CPU 40 (S130 above), and processing ends. If the account number is correct, a start pre-scanning command is sent to the CPU 40 (S138).

When the CPU 40 receives a start pre-scanning command it pre-scans the check and runs a threshold value determination process (S140) until a threshold value for binarizing the image data is determined.

Figure 6:
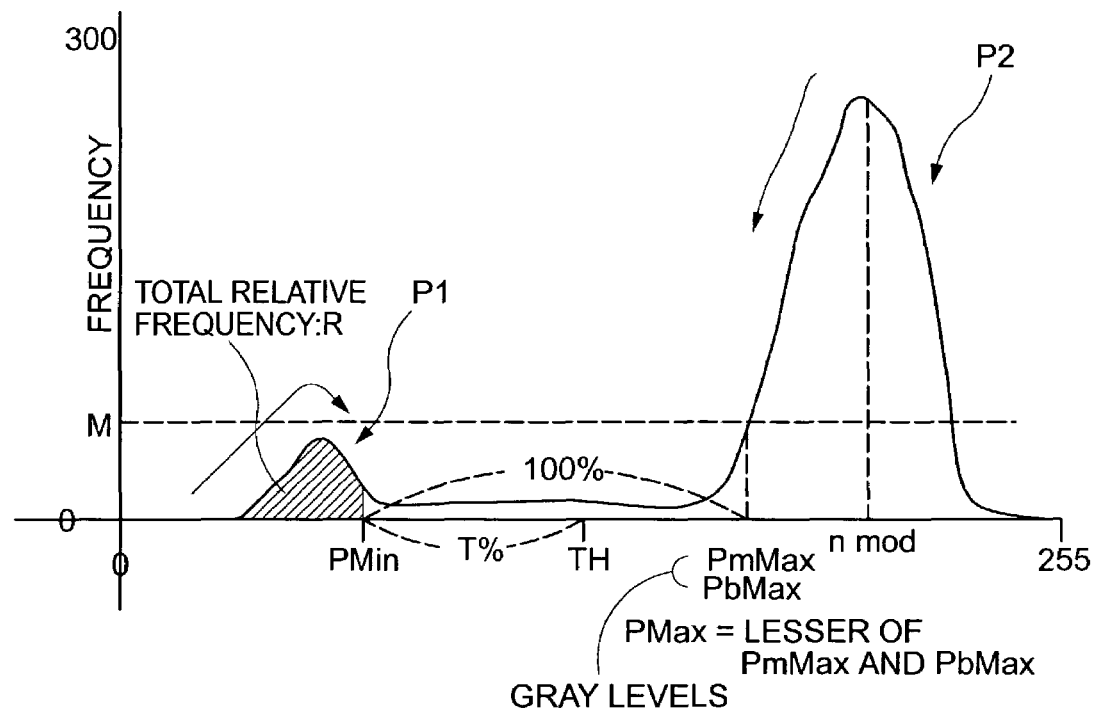
FIG. 6 describes the principle for determining the threshold value in the threshold value determination process of the first embodiment, and is an exemplary graph of the gray level distribution in the pixels of the check image.

FIG. 6 is used to describe the principle used to set the threshold value in the threshold value determination process of this embodiment, and shows the frequency distribution of gray levels in the pixels of the check image. The threshold value determination process of this embodiment separates the gray level frequency distribution into peak P1 and peak P2 levels, and sets the median between PMin at the upper limit of the dark peak P1 values and PMax at the lower limit of the bright peak P2 values as threshold value TH. Parts of the image with a low gray level value (i.e., dark colored parts) corresponding to printing on the check and handwritten letters are in the peak P1 range, and parts with a high gray level value (i.e., light colors) corresponding to the check background are in the peak P2 range.

Figure 7:
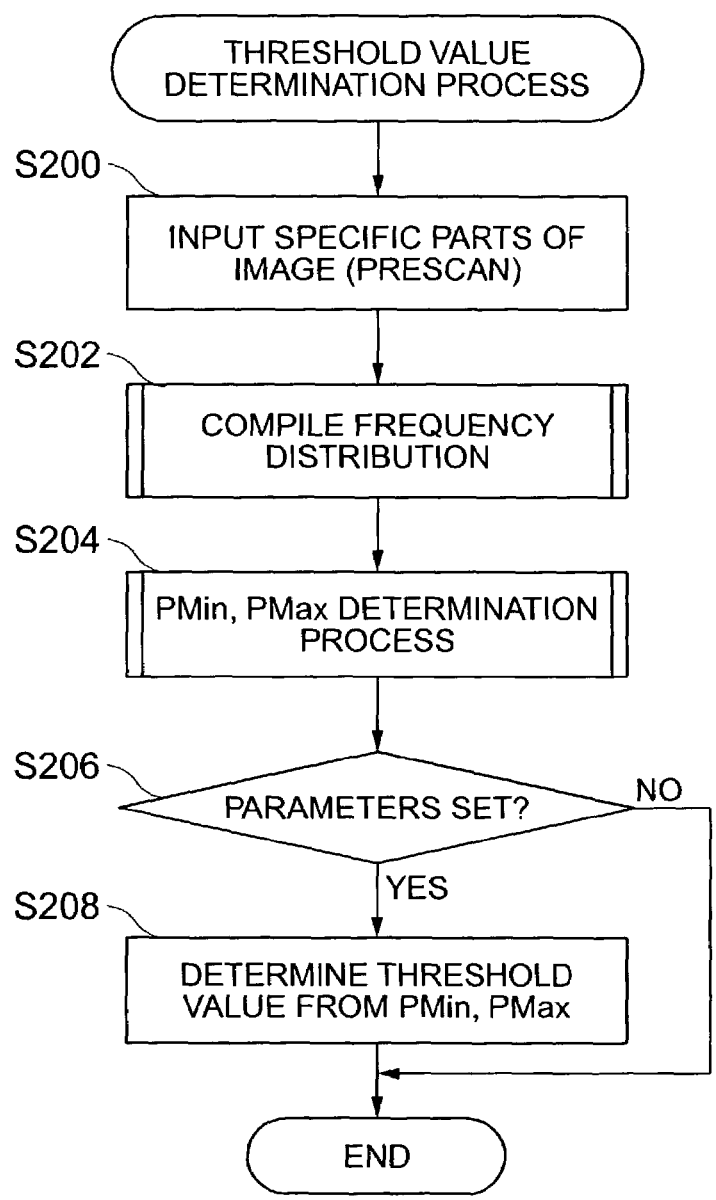
FIG. 7 is a flow chart showing an outline of the threshold value determination process run by the CPU of the check processing apparatus.
Figure 8:
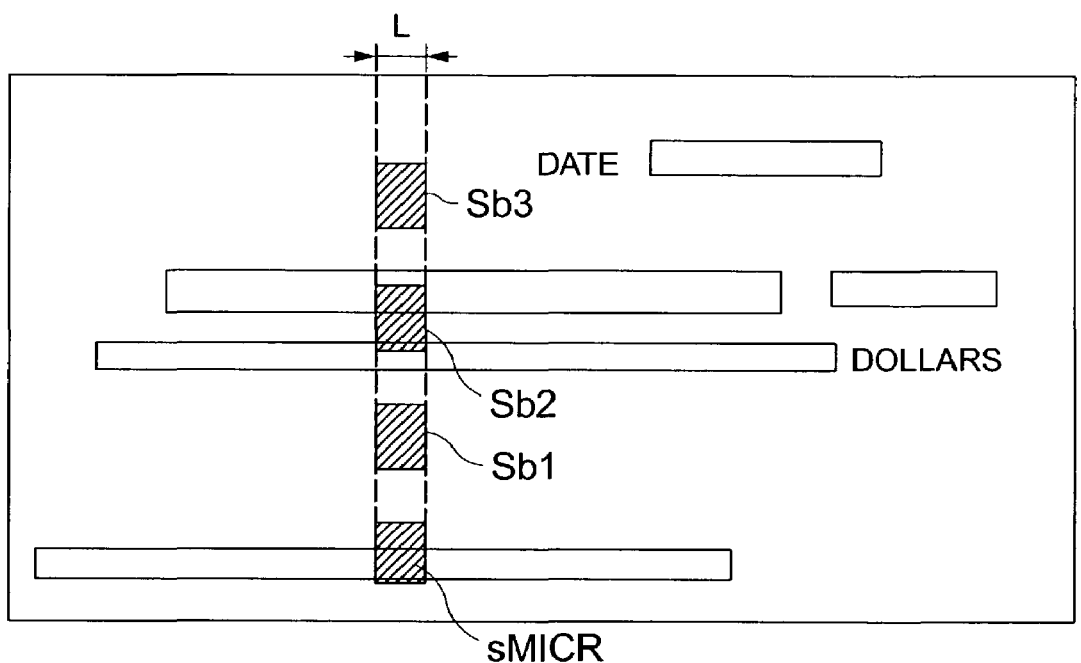
FIG. 8 shows the parts of the check from which images are captured by pre-scanning.

FIG. 7 is a flow chart showing the outline of the threshold value determination process run by the CPU 40 based on this principle. The first step is to capture an image of the check (image data) by pre-scanning specific parts of the check (S200). FIG. 8 shows the parts of the check captured by this pre-scanning operation. As shown in FIG. 8 pre-scanning captures images of the area SMICR overlapping the MICR recording area 60 where magnetic ink characters are recorded (below referred to as MICR part Sm), and areas Sb1 to Sb3 where magnetic ink characters are not recorded (the non-MICR parts). In this embodiment of the invention MICR part SMICR and non-MICR parts Sb1 to Sb3 are in a row width-wise across the check. When the check is scanned an image is read by the scanner 50 while transporting the check lengthwise passed the scanner 50. By thus selecting MICR part SMICR and non-MICR parts Sb1 to Sb3 pre-scanning can be completed by advancing the check the length L of these parts as shown in FIG. 8, and the time required for pre-scanning can thus be shortened.

Pre-scanning shall not, however, be limited to these areas, and the pre-scanning areas can be desirably selected in order to determine the most appropriate threshold values. For example, two or more MICR areas could be scanned instead of just one, and 1, 2, 4, or other number of non-MICR parts other than 3 could be scanned. The location and size of the pre-scanning areas can also be otherwise selected.

When pre-scanning is completed a frequency distribution representing the frequency of gray levels in the pre-scanned image data is compiled (S202).

Figure 9:
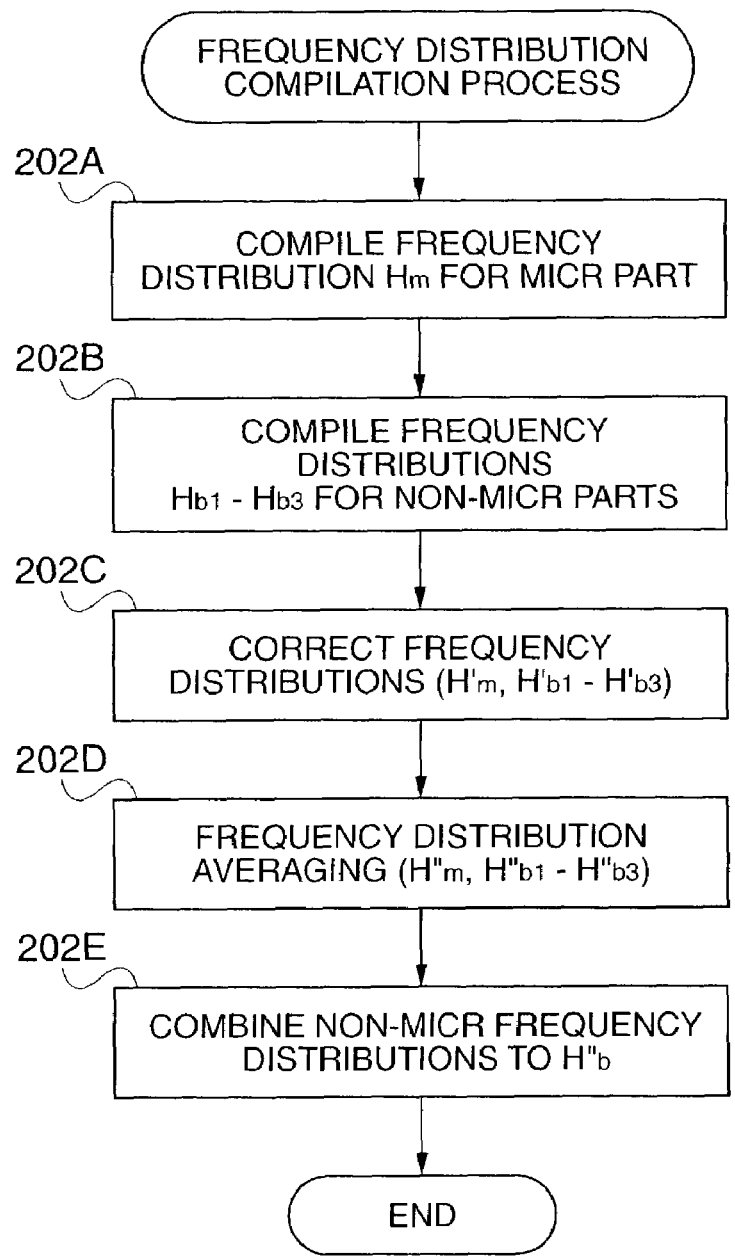
FIG. 9 is a flow chart showing the details of the gray level distribution compiling process.

FIG. 9 is a flow chart showing the frequency distribution compiling process in detail. As shown in the figure the first step is to determine frequency distribution $H_m(g)$ from image data in the MICR part SMICR (S202A) where g is a value from 0 to 255 in this embodiment denoting the gray level of each pixel with a higher value indicating a brighter (whiter) gray level. The MICR part SMICR is the part of the check containing particularly important information and is therefore weighted by, for example, doubling the value of each frequency when compiling the frequency distribution $H_m(g)$, that is, $H_m(g)=2 \cdot H_m(g)$ in MICR part SMICR.

Frequency distributions $H_{b1}(g)$, $H_{b2}(g)$, and $H_{b3}(g)$ are then determined from the image data for the non-MICR parts Sb1 to Sb3 (S202B).

Frequency distributions $H_m(g)$, $H_{b1}(g)$, $H_{b2}(g)$, and $H_{b3}(g)$ are then corrected as follows to obtain $H'_m(g)$, $H'_{b1}(g)$, $H'_{b2}(g)$, and $H'_{b3}(g)$, respectively (S202C).

If $g \leq BGth$, $H'_m(g)=H_m(g)$ $H'_{bi}(g)=H_{bi}(g)$ ($i=1,2,3$)

If $g > BGth$, $H'_m(g)=0$ $H'_{bi}(g)=0$ ($i=1,2,3$)

where BGth is set to the minimum gray level, such as 254, detected when imaging the check background where a scanning object is not before the photodetector of the scanner 50. The above correction therefore clears to zero the frequency of image areas where an image of the back of the check is also included in the scanned image so that the frequency distribution can be correctly determined for only the desired parts of the check.

The average of each frequency distribution is then determined by calculating the average of a total (2·K+1) frequencies, that is, the frequency of gray level g and the frequency of the 2·K gray levels adjacent thereto (the K gray levels higher and the K gray levels lower than gray level g), for the frequency of each gray level g in the corrected frequency distributions $H'_m(g)$, $H'_{b1}(g)$, $H'_{b2}(g)$, and $H'_{b3}(g)$ (S202D).

More specifically, $H''_m(g)$ is calculated for MICR part SMICR using equation (1) set forth below:

$$H''_m = \begin{cases} \sum_{k=-K}^{K} H'_m(g+k)/(2 \cdot K + 1) & K \leq g \leq 255 - K \\ 0 & g < K, g > 255 - K \end{cases}$$

and $H''_{b1}(g)$, $H''_{b2}(g)$, and $H''_{b3}(g)$ are calculated for non-MICR parts Sb1 to Sb3 using equation (2) below:

$$H''_{bi} = \begin{cases} \sum_{k=-K}^{K} H'_{bi}(g+k)/(2 \cdot K + 1) & K \leq g \leq 255 - K \\ 0 & g < K, g > 255 - K \end{cases}$$

$i = 1, 2, 3$ where K is a desirable value such as 4.

This averaging process removes noise components from the frequency distribution, and enables features in different parts of the image to be correctly expressed by the frequency distribution.

The unified frequency distribution $H''_b(g)$ is calculated for the non-MICR parts by obtaining the sum of frequency distributions $H''_m(g)$, $H''_{b1}(g)$, $H''_{b2}(g)$, and $H''_{b3}(g)$ for the non-MICR parts using the following equation (S202E):

$$H''_b(g) = H''_{b1}(g) + H''_{b2}(g) + H''_{b3}(g)$$

(g=0 to 255)

This completes the frequency distribution calculation process.

A process for determining parameters PMin and PMax for calculating the threshold value from the resulting frequency distributions $H''_m(g)$ and $H''_b(g)$ is run next (S204, FIG. 7).

Figure 10:
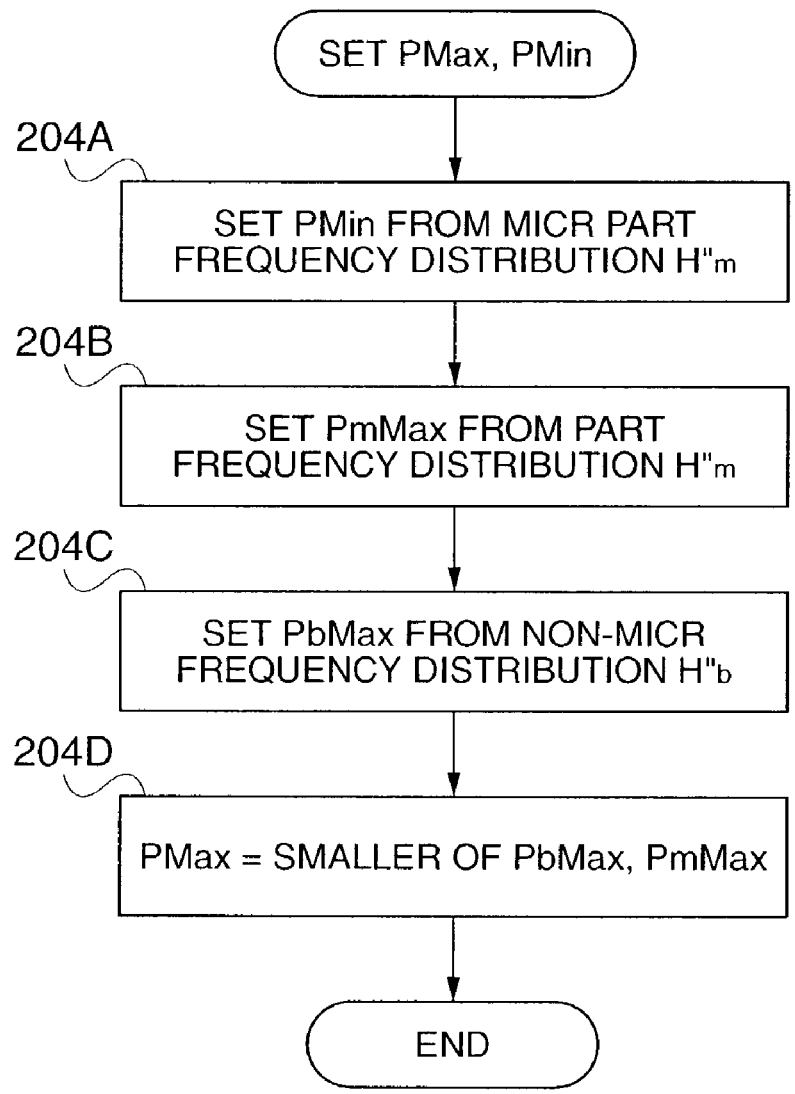
FIG. 10 is a flow chart showing the detailed content of a process for determining parameters PMin and PMax.

FIG. 10 is a flow chart showing the details of the process for determining parameters PMin and PMax. As shown in FIG. 10 the first step in this process is to determine parameter PMin from the frequency distribution $H''_m(g)$ for MICR part SMICR (S204A). This parameter PMin is obtained as the value where the sum of g=0 to PMin is a specific value R (e.g., 0.1) (see the left side of FIG. 6) for relative frequency r(g) (the ratio to the total frequency) of MICR part SMICR frequency distribution $H''_m(g)$. That is, PMin is $$r(g) = H''(g) \bigg/ \sum_{k=0}^{255} H''_m(k) \qquad \text{equation (3)}$$

and g is obtained as the highest value where $$\sum_{k=0}^{g} r(k) < R \qquad \text{equation (4)}$$

is true.

Parameter PMax is then obtained from the frequency distribution $H''_m(g)$ for MICR part SMICR (S204B). More specifically, using the value of g with the highest frequency in frequency distribution $H''_m(g)$ as maximum frequency nmod, the value of g is decreased one at a time from nmod to find the first value of g in frequency distribution $H''_m(g)$ that is less than a specific value M (such as 30). This value is then set to PmMax (see the right side of FIG. 6).

Parameter PbMax is then obtained from the frequency distribution Hb(g) for the non-MICR parts (S204C). This parameter PbMax is obtained similarly to PmMax above. That is, the value nmod for the peak g in frequency distribution $H''_b(g)$ is detected, and nmod is decremented one at a time to find the first value g in frequency distribution $H''_b(g)$ where the value of $H''_b(g)$ is less than a specific value M. This value is then set to PbMax.

PmMax for the MICR part SMICR and PbMax for the non-MICR parts are then compared and the smaller value is used as PMax (S204D).

After parameters PMin and PMax are thus obtained it is determined whether a threshold value for binarizing the image can be determined (S206, FIG. 7). More specifically, a threshold value cannot be determined if PMax is 0, but otherwise a threshold value can be determined. If PMax is 0 then there is no frequency on the down side of the peak frequency (that is, the side on which the gray level decreases) less than constant M in either frequency distribution $H''_m(g)$ for the MICR part SMICR or frequency distribution $H''_b(g)$ for the non-MICR parts Sb. This occurs in the background areas where text is not written on the check and peak P2 for light colors is not clearly evident in the frequency distribution, and a threshold value therefore cannot be determined. In other words, information contained in the original image data cannot be reproduced in the binarized image.

If the threshold value can be determined, threshold value TH is calculated using PMin and PMax (S208, FIG. 7). More specifically, threshold value TH is the value between PMin and PMax offset T % (e.g., 58%) from PMin, .e., $$TH = P\text{Min} + (P\text{Min} - P\text{Max}) \times T/100.$$

However, if PMin≧PMax (that is, peak P1 on the dark side and peak P2 on the bright side overlap), then threshold value TH=PMin.

When CPU 40 completes this threshold value determination process it sends a result indicating whether the threshold value was determined to the host computer 28 (S142, FIG. 4)

The host computer 28 then evaluates the process result from the CPU 40 (S144, FIG. 5). If the threshold value was set it is determined that the information items required to identify the check can be reproduced if the image data is binarized. The binary image data can therefore be used as proof of a transaction, and the process proceeds from step S146 on the assumption that the check payment will be electronically processed. If the threshold value could not be determined the information items required to identify the check cannot be reproduced if the image data is binarized, and the process proceeds from step S174 on the assumption that the check payment will be processed conventionally, that is, not electronically.

When payment is processed electronically based on a check, the check is returned at the point-of-sale from the store to the customer, and the store retains an image of the check as proof of payment by check. The image data is therefore first binarized to compress the image before being stored.

However, if binary image data is to be used as proof of a transaction it must be possible to read the information on the check, particularly including the check number, payer account number, and payer signature, from the stored image. If a threshold value for binarization cannot be determined it will not be possible to identify the check and check information from the binary image data, the image data therefore cannot be used as proof of the transaction, and payment by check is not processed electronically.

If the threshold value TH for binarizing the image data is set the host computer 28 first sends an endorsement printing command to the CPU 40 (S146). The CPU 40 then drives the check transportation unit 52 to advance the check to the starting position for endorsement printing, and then drives the endorsement printing unit 46 to print the endorsement to the back of the check (S148).

When the host computer 28 receives a signal from the CPU 40 that endorsement printing is completed it sends a check voiding printing command to the CPU 40 (S150). The CPU 40 then drives the check transportation unit 52 to advance the check to the printing start position for check voiding and voids the check by printing VOID or similar phrasing to the check face by means of check printing unit 44 (S152). If capturing the check void printing in the image data is undesirable, check void printing can be run as a separate process.

When the host computer 28 receives a signal from the CPU 40 that check void printing is completed it determines (S154) whether to print the front of the check based on the result returned from step S112 indicating whether the check was already written. If the check has not been written the host computer 28 determines that the front of the check must be printed and sends a command to the CPU 40 for printing the payee, date, amount, and other necessary items to the check face (S156). The CPU 40 then drives the check transportation unit 52 to carry the check to the check face printing start position, and then drives the check printing unit 44 to write the check (S158).

When the host computer 28 receives a signal from the CPU 40 that printing the check face is completed it advances to step S160. If it determines in step S154 that the check was already written, the host computer 28 knows it is unnecessary to print the check face, and advances to step S160 without printing to the face.

It should be noted that of the payee, amount, and date items printed to the check face the payee is the name of the store where the system is used and is preset for each system, the amount is the payment amount determined in step S100 above, and the date is obtained from the system clock. It is therefore not necessary to input this information each time a check is printed.

In addition, the endorsement items are also preset in each system and could include the cash register number, for example, if there are multiple cash registers in the store. The host computer 28 or check processing unit 10 could also be set to not print the endorsement. In this case the endorsement printing commands are omitted in steps S146 and S176 (described below) if endorsement printing is turned off in the host computer 28, or the endorsement printing command is ignored in step S148 if received from the host computer 28 and endorsement printing is turned off at the check processing unit 10.

The host computer 28 then sends an image capture command to the CPU 40 to scan the check (S160). When the CPU 40 receives this command it drives the scanner 50 to scan the check while driving the check transportation unit 52 to carry the check passed the scanner and eject the scanned check from the exit opening 16 (S162). The 256-level image data captured by scanning with the scanner 50 is then binarized using the threshold value TH set by the threshold value determination process in S140 (S164), and the binary image data is sent to the host computer 28 (S166). The host computer 28 then stores the binary image data in storage device 30 together with the account number of the check, amount, and other payment data (S168). It should be noted that the image data captured by scanning in step S162 could include the entire face of the check or only the parts required to capture specific information from the check, such as the check number, account number, payer signature, and amount.

The host computer 28 also sends a command to the CPU 40 to print the agreement (an agreement enabling electronically processing the check) (S170). The CPU 40 then prints two copies of the agreement using roll paper printing unit 48 (S172).

The ejected check scanned in step S162, two copies of the agreement printed to roll paper in step S172, and the detailed receipt printed by the receipt printing unit 24 during the checkout process are then handed to the customer. A signed copy (original) of the agreement is then received back from the customer and retained by the store. As described further below, the payment is then processed electronically by communication between the host computer 28 and payment processing server 34 that night or at some other time.

If the host computer 28 determines in step S144 that the threshold value could not be set, it displays a message on the display unit 22 indicating that payment by check cannot be electronically processed (S174). As in steps S146, S154, and S156 when the threshold value is set, an endorsement printing command is sent (S176), whether the check was already written is determined (S178), a check face printing command is sent (S180) appropriately, an eject check command is sent to the CPU 40 (S182), and the check is then ejected from the exit opening 16 by the CPU 40 (S184). It should be noted that the message indicating that the check cannot be electronically processed can be displayed on an LCD or other display device at the check processing unit 10 rather than the host computer 28.

If approval for electronic check processing is not received in step S110 (FIG. 4), the host computer 28 displays instructions on the display unit 22 for inserting the check for printing the front and back (S186), and operation then proceeds from step S176 in FIG. 5.

When the check is then ejected in step S184 only the detailed sales receipt is returned to the customer and the check is retained by the store for conventional, i.e., not electronic, check processing.

At a specific time each day, such as during the night, the host computer 28 sends a payment processing request to the payment processing server 34 based on the payment data stored in the storage device 30. In response to this payment request the payment processing server 34 then runs a process for transferring funds from the account identified by the account number of each check to the account specified by the store, thus completing payment by check.

As described above this embodiment of the invention determines whether a threshold value for binarizing the image data can be determined based on the 256-level image data captured by pre-scanning the MICR part and non-MICR parts of the check. If the threshold value is set it is known that the image data can be binarized and compressed without losing any information needed to identify the check (that is, the required information can be reproduced with the binary image data), and the binary image data is recorded for electronic processing.

When check payment is processed electronically this embodiment of the present invention can therefore store a compressed check image as proof of a transaction while requiring minimal storage space.

If the image data is compressed by binarization when this threshold value cannot be set, information needed to identify the check might be lost. Electronic processing is therefore prohibited and the check is processed conventionally. The present invention is therefore able to prevent discovering that the stored binary image data cannot be used as proof of payment by check after the check has been returned to the customer (payer) on the assumption that payment will be processed electronically. In order to prevent this problem it is also not necessary to display the binary image data on the screen for the clerk to visually determine whether the image can be binarized, thereby improving productivity and preventing human errors in image evaluation.

The present invention thus only binarizes and stores check images when it is determined that the required information can be read after binarizing and compressing the image data, and can therefore prevent being unable to read the required information from the stored image data.

A second embodiment of the present invention is described next below. In this preferred embodiment the CPU 40 and host computer 28 of the system shown in FIG. 1 and FIG. 2 run the process shown in FIG. 4 and the processes shown in FIG. 11 and FIG. 12.

Figure 11:
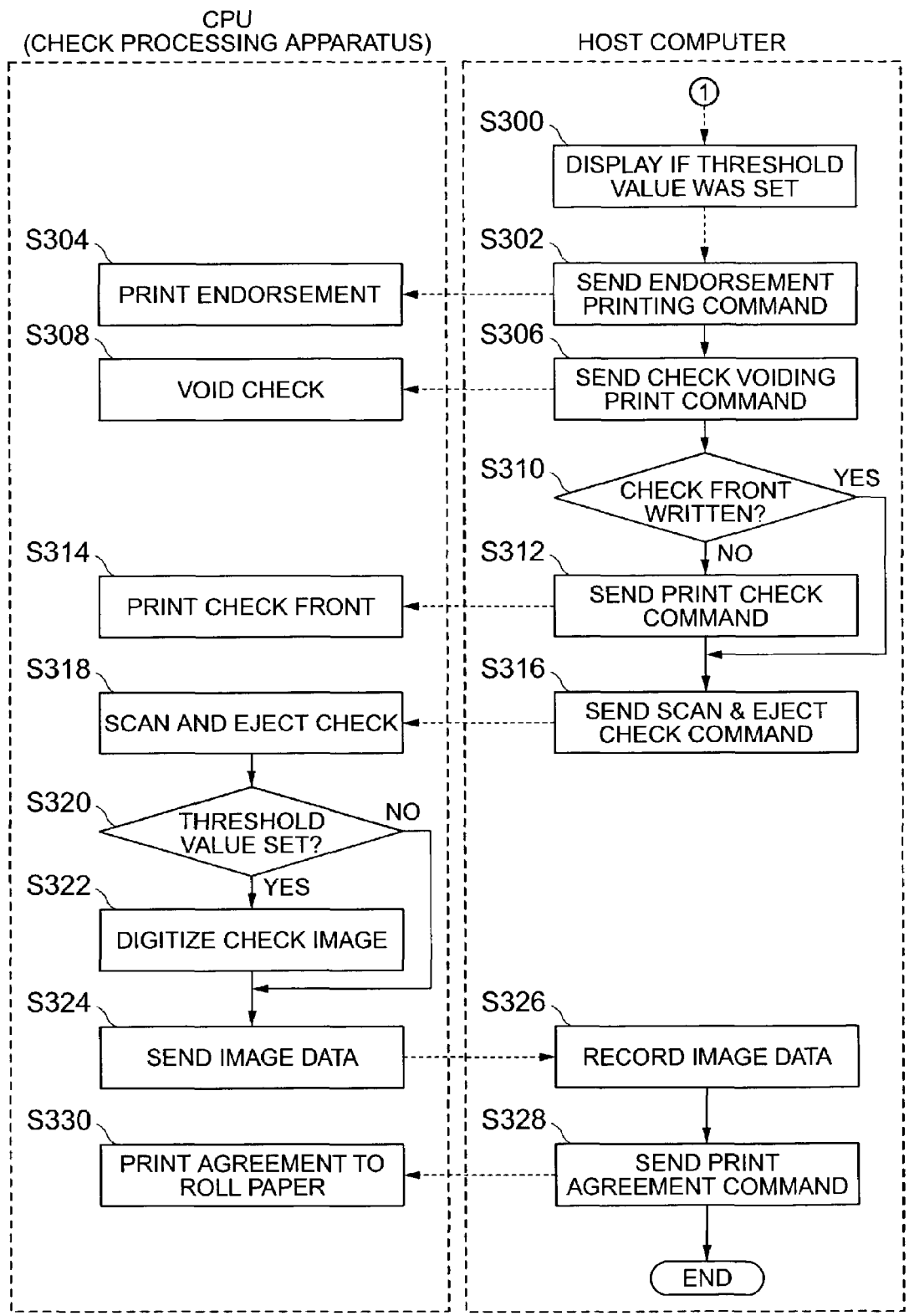
FIG. 11 is a first flow chart of a process run in conjunction with the process shown in FIG. 4 in accordance with a second embodiment of the invention.

If based the result of the threshold value determination process received from the CPU 40 (S142, FIG. 4) the host computer 28 determines that the threshold value could not be set, it displays an appropriate message (indicating that image binarization failed) (S300, FIG. 11). This display could be omitted, however. If omitted the CPU 40 could simply tell (S142, FIG. 4) the host computer 28 that the threshold value determination process ended.

When the host computer 28 receives this process result from the CPU 40, it sends a command to the CPU 40 to print the endorsement (S302). The CPU 40 then drives the check transportation unit 52 to advance the check to the starting position for endorsement printing, and then drives the endorsement printing unit 46 to print the endorsement to the back of the check (S304).

When the host computer 28 receives a signal from the CPU 40 that endorsement printing is completed it sends a check voiding printing command to the CPU 40 (S306). The CPU 40 then drives the check transportation unit 52 to advance the check to the printing start position for check voiding and voids the check by printing VOID or similar phrasing to the check face by means of check printing unit 44 (S308).

When the host computer 28 receives a signal from the CPU 40 that check void printing is completed it determines (S310) whether to print the front of the check based on the result (S112, FIG. 4) indicating whether the check was already written. If the check has not been written the host computer 28 determines that the front of the check must be printed and sends a command to the CPU 40 for printing the payee, date, amount, and other necessary items to the check face (S312). The CPU 40 then drives the check transportation unit 52 to carry the check to the check face printing start position, and then drives the check printing unit 44 to write the check (S314).

When the host computer 28 receives a signal from the CPU 40 that printing the check face is completed it advances to step S316. If it determines in step S310 that the check was already written, the host computer 28 knows it is unnecessary to print the check face, and advances to step S316 without sending a print command.

It should be noted that as in the first embodiment the items printed to the check face do not need to be input each time a check is printed, and the endorsement items are preset for each system. Furthermore, the host computer 28 or check processing unit 10 could also be set to not print the endorsement. In this case the endorsement printing command is omitted in step S302 if endorsement printing is turned off in the host computer 28, or the endorsement printing command is ignored in step S304 if received from the host computer 28 and endorsement printing is turned off at the check processing unit 10.

The host computer 28 then sends an image capture command to the CPU 40 to scan the check (S316). When the CPU 40 receives this command it drives the scanner 50 to scan the check while driving the check transportation unit 52 to carry the check passed the scanner and eject the scanned check from the exit opening 16 (S318). As in the first embodiment the image data captured by scanning in step S318 could include the entire face of the check or only the parts required to capture specific information from the check, such as the check number, account number, payer signature, and amount.

The CPU 40 then determines if the threshold value determination process was able to set the threshold value in step S140, FIG. 4 (S320). If the threshold value was able to be set it is known that the information items required to identify the check can be reproduced if the image data is binarized. The binary image data can therefore be used as proof of a transaction. The image data is then binarized using the threshold value TH (S322), and the binary image data is sent to the host computer 28 (S324).

If the threshold value could not be determined the information items required to identify the check cannot be reproduced if the image data is binarized. The scanned 256-level image data is therefore sent directly to the host computer 28 (S324) without being binarized.

When a threshold value cannot be determined for the check image data and a binarized check image therefore cannot be used as proof of the transaction, this embodiment of the invention thus sends and stores the gray scale image data as it was scanned, that is, without binarization, in the host computer 28.

The host computer 28 then stores the image data sent from the CPU 40 in storage device 30 together with the account number of the check, amount, and other payment data (S326).

The host computer 28 also sends a command to the CPU 40 to print the electronic processing agreement (S328). The CPU 40 then prints two copies of the agreement using roll paper printing unit 48 (S330).

As in the first embodiment the ejected check scanned in step S162, two copies of the agreement printed to roll paper in step S330, and the detailed receipt printed by the receipt printing unit 24 during the checkout process are then handed to the customer. A signed copy (original) of the agreement is then received back from the customer and retained by the store. The payment is then processed electronically by communication between the host computer 28 and payment processing server 34 that night or at some other time.

Figure 12:
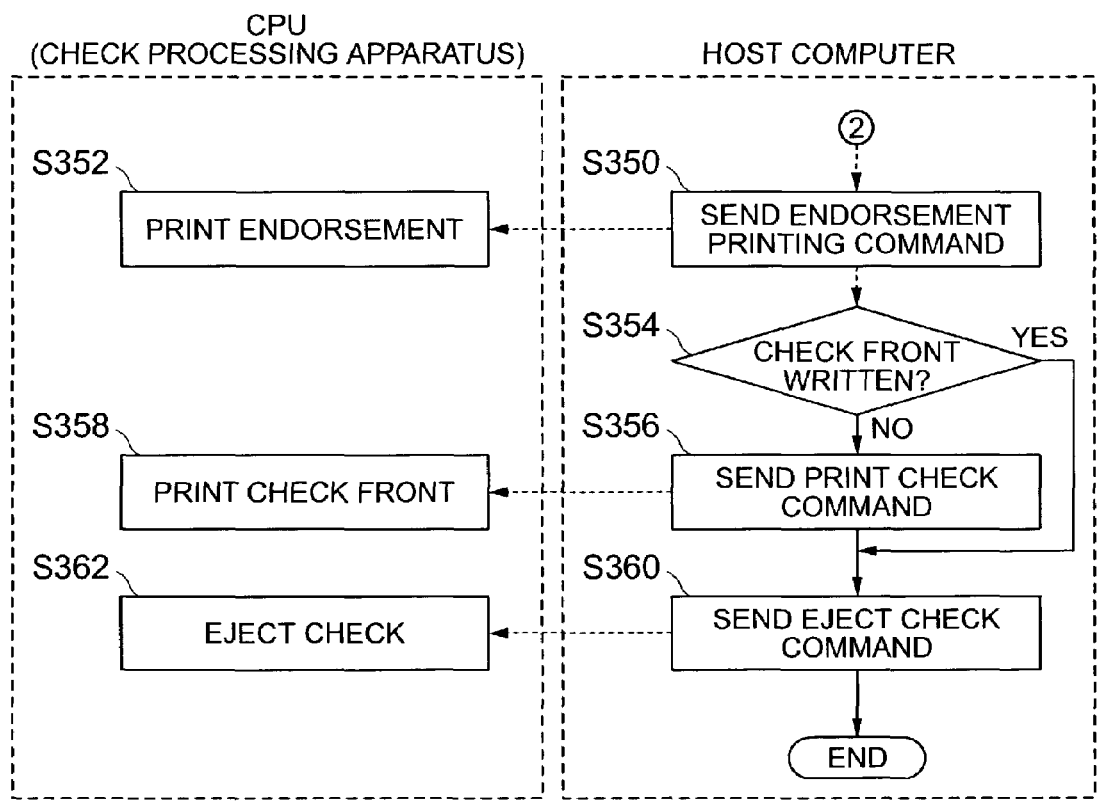
FIG. 12 is a second flow chart of a process run in conjunction with the process shown in FIG. 4 in accordance with a second embodiment of the invention.

If approval for electronic check processing is not received in step S110 (FIG. 4), the host computer 28 displays instructions on the display unit 22 for inserting the check for printing the front and back (S186, FIG. 4), and operation then proceeds from step S350 in FIG. 12.

That is, as in steps S302, S310, and S312 in FIG. 11, an endorsement printing command is sent (S350), whether the check was already written is determined (S354), and a check face printing command is sent (S356) appropriately to the CPU 40, and the CPU 40 then prints the endorsement (S352) and face (S358) as instructed. The host computer 28 then sends an eject check command to the CPU 40 (S360), and the CPU 40 then ejects the check from the exit opening 16 (S362).

When the check is then ejected only the detailed sales receipt is returned to the customer and the check is retained by the store for conventional, i.e., not electronic, check processing.

As described above this embodiment of the invention determines whether a threshold value for binarizing the image data can be determined based on the 256-level image data captured by pre-scanning the MICR part and non-MICR parts of the check. If the threshold value is set it is known that the image data can be binarized and compressed without losing any information needed to identify the check, and the image data is binarized and recorded.

When processing check payments electronically this embodiment of the present invention can therefore compress and store the image data in less storage space when it is determined that the check image can be used as proof of a transaction after it is binarized and compressed. However, if it is determined that the check image cannot be used as such proof if it is binarized and compressed, this embodiment stores the gray scale check image as it was scanned. The present invention is therefore able to prevent discovering that the stored binary image data cannot be used as proof of payment by check after the check has been returned to the customer (payer). In order to prevent this problem it is also not necessary to display the binary image data on the screen for the clerk to visually determine whether the image can be binarized, thereby improving productivity and preventing human errors in image evaluation.

This embodiment of the invention thus binarizes the image data when it is determined that the required information can be read even if the image data is binarized and compressed, and otherwise stores the gray scale image data as it was scanned. It is therefore able to prevent being unable to read necessary information from the stored image data.

Whether the customer has approved electronic check processing is input (S110) before pre-scanning in the above two embodiments, and the check is pre-scanned and the threshold value determination process run only when electronic processing is approved. It is therefore possible to skip the pre-scan and threshold value determination processes when the customer does not want the check processed electronically.

These embodiments also read the magnetic ink characters before pre-scanning and immediately eject the check if the magnetic ink characters cannot be read from the check. As noted above, it is therefore possible to prevent processing from continuing if the check is inserted backwards, for example. On the other hand, if the magnetic ink characters were read the account number can be recognized and stored from the read MICR data, and electronic processing can be completed automatically through communication with the payment processing server 34.

These embodiments are also able to prevent a used check from being used again by printing VOID on the check when the threshold value is set in the threshold value determination process. This also eliminates the need to manually write VOID on the check in order to prevent it from being reused. Furthermore, because VOID is not printed when electronic processing is not possible because the threshold value could not be set, voiding the check before the check payment is processed can also be prevented.

Yet further, because these embodiments can print the front and back of the check regardless of whether the threshold value can be set in the threshold value determination process (that is, regardless of whether the check payment is electronically processed), the need to manually write and endorse the check can also be eliminated. Furthermore, because the operator inputs whether the check was already written (S112) and the check processing unit 10 does not print the check face if the check was written, overwriting onto an already written check can be prevented.

The check is also scanned after printing the check face and the captured image data is then binarized and stored when the check payment is electronically processed. The stored image data therefore contains the content from the check face, and the reliability of the image data as proof of a transaction can be improved.

It will be further noted that the present invention has been described using 256-level gray scale image data that is binarized and compressed. The scanned image data shall not be limited to 256 gradations, however, and a higher resolution image with 512 gradations or lower resolution image with 128 gradations, for example, could be used. Data compression shall also not be limited to 1-bit (binary) conversion, and conversion to 4 levels (2-bit) or other low resolution image is also possible. Furthermore, the original image data could be color, in which case the amount of data can be reduced by conversion to gray scale or by reducing the number of colors.

Compressing the size of the image data shall also not be limited to reducing the number of gray levels in the image, and other appropriate image data compression methods can be used. In other words, the image data can be compressed and stored using any compression method enabling the required information to still be read from the compressed image.

These embodiments have also been described with the CPU 40 binarizing the 256-level image data generated by the scanner 50 scanning the check, but the scanner 50 could alternatively be designed to binarize the image data using the threshold value specified by the CPU 40 and then send the binary image data to the CPU 40. In this case the first embodiment is modified so that check scanning and image binarization in steps S162 and S164 (FIG. 5) are replaced by sending a command from the CPU 40 to the scanner 50 for generating image data binarized at the supplied threshold value TH.

The second embodiment is modified in this case so that when a check scanning command is output from the host computer 28 in step S316 (FIG. 11) it is first determined if the threshold value was set. If the threshold value was set, a command is sent from the CPU 40 to the scanner 50 for generating image data binarized at the supplied threshold value TH. If the threshold value could not be set, a command is sent to generate 256-level image data.

Furthermore, in the above embodiments the host computer 28 displays a message on the display unit 22 indicating that the check cannot be electronically processed (S174) when it is determined in step S144 (FIG. 5) that the threshold value could not be set. Instead of the host computer 28, however, the check processing unit 10 could notify the operator that the check cannot be electronically processed. That is, if the result of check pre-scanning and the threshold value determination process (S140, FIG. 4) is that the threshold value cannot be determined, the operator could be visually or audibly so informed by means of a reporting unit 58 disposed to the check processing unit 10.

These embodiments are also described with the check processing unit 10 executing the various processes and steps according to commands from a host computer 28 with display and input operations handled on the host computer 28. The invention shall not be so limited, however, and the check processing unit 10 and host computer 28 could integrated as a single system.

Yet further, endorsement printing, void printing, and check front printing are executed in this order in the preceding embodiments, but printing shall not be limited to this order. The printing sequence could be set according to the relative positions of the respective printing units so that the check is transported the shortest distance, for example.

Yet further, the threshold value for binarizing the image data is determined according to the process shown in FIG. 7 in these embodiments, but the invention shall not be so limited and various other appropriate methods could be used.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for processing a check payment transaction, comprising:
   using a scanner to capture at a first compression rate image data representing at least one part of a check received from a customer;
   using a computer processing unit to evaluate, based on the image data captured at the first compression rate, whether information contained in the at least one part of the check can be reproduced by image data at a second compression rate that is greater than the first compression rate; wherein
   when the evaluating step determines that the information in the at least one part of the check can be reproduced by image data at the second compression rate, then
      capturing at the second compression rate image data representing at least the at least one part of the check,
      storing the check image data captured at the second compression rate, and
      electronically processing the check payment transaction using the check image data captured at the second compression rate; and
   when the evaluating step determines that the information in the at least one part of the check image cannot be reproduced by image data at the second compression rate, then
      processing the check payment transaction using the check received from the customer without capturing check image data at the second compression rate.

2. The check processing method as described in claim 1, further comprising:
   determining whether or not to electronically process the check payment transaction; and
   executing the first compression rate capturing step only when it is determined to electronically process ths check payment transaction.

3. The check processing method as described in claim 1, further comprising:
   reading payment information including payer account information pre-recorded on the check;
   executing the first compression rate capturing step only when the payment information is recognized in the payment information reading step; and
   interrupting further processing when the payment information is not recognized.

4. The check processing method as described in claim 1, further comprising printing check voiding information on the check when the at least one part of the check image are determined reproducible by the evaluating step.

5. The check processing method as described in claim 1, further comprising printing at least one item required on a check on a front side of the check.

6. The check processing method as described in claim 5, further comprising:
   determining whether the required at least one item is already recorded on the check before executing the printing step; and
   skipping the printing step when it is determined that the required at least one item is already recorded an the check.

7. The check processing method as described in claim 6, wherein, when the printing step is executed it precedes the second compression rate capturing step.

8. The check processing method as described in claim 1, wherein the image data at the first compression rate is image data containing a first number of gradations, and the image data at the second compression rate is image data containing a second number of gradations that is less than the first number of gradations.

9. The check processing method as described in claim 8, wherein the image data at the second compression rate is a binary image; the evaluating step includes determining a threshold value for obtaining the binary image, and determining that the information contained in the at least one part of the check image is not reproducible at the second compression rate when the threshold value cannot be determined.

10. The check processing method as described in claim 1, wherein the second compression rate capturing step includes converting image data at the first compression rate to image data at the second compression rate.

11. An apparatus for processing a check, comprising:
   a scanner configured to scan a check inserted in the apparatus and to capture image data of a scanned check at a first compression rate and at a second compression rate that is greater than the first compression rate;
   a computer processing unit configured to determine, based on check image data captured at the first compression rate, whether information contained in at least one part of the check is reproducible by image data at the second compression rate; and
   a storage device configured to store check image data captured at the second compression rate;
   wherein check image data is captured at the second compression rate, stored in the storage unit, and used for processing a payment transaction in connection with the check only when the computer processing unit determines that the information contained in the at least one part of the check is reproducible by image data at the second compression rate; otherwise, when the computer processing unit determines that the information contained in the at least one part of the check is not reproducible by image data at the second compression rate, the payment transaction is processed without capturing image data of the check at the second compression rate.

12. The check processing apparatus as described in claim 11, further comprising a check transportation unit configured to eject the check from the apparatus.

13. The check processing apparatus as described in claim 11, further comprising a notification unit configured to inform an operator when the computer processing unit determines that the information contained in the at least one part of the check is not reproducible by image data at the second compression rate.

14. The check processing apparatus as described in claim 11, wherein the image data capturing unit is adapted to convert image data captured at the first compression rate to image data at the second compression rate.

15. The check processing apparatus as described in claim 11, wherein the image data at the first compression rate is image data containing a first number of gradations, and the image data at the second compression rate is image data containing a second number of gradations that is less than the first number of gradations.

16. The check processing apparatus as described in claim 15, wherein the image data at the second compression rate is a binary image, and the computer processing unit determines that the information contained in the at least one part of the check image is not reproducible at the second compression rate when a threshold value for obtaining the binary image cannot be determined.

17. A check processing apparatus for capturing a check image and sending the captured check image to a host device, comprising:
   a scanner configured to scan a check inserted in the apparatus and to capture image data of a scanned check at a first compression rate and at a second compression rate that is greater than the first compression rate;
   a computer processing unit configured to determine, based on check image data captured at the first compression rate, whether information contained in at least one part of the check is reproducible by image data at the second compression rate; and
   a transmission unit configured to send image data captured at the second compression rate to the host device when the computer processing unit determines that the information contained in the at least one part of the check is reproducible by image data at the second compression rate, and configured to notify the host device when the computer processing unit determines that the information contained in the at least one part of the check is not reproducible by image data at the second compression rate.

18. The check processing apparatus as described in claim 17, further comprising a check transportation unit configured to eject the check from the apparatus.

19. The check processing apparatus as described in claim 17, wherein the scanner is configured to convert image data captured at the first compression rate to image data at the second compression rate.

20. The check processing apparatus as described in claim 17, wherein the image data at the first compression rate is image data containing a first number of gradations, and the image data at the second compression rate is image data containing a second number of gradations that is less than the first number of gradations.

21. The check processing apparatus as described in claim 17, wherein the image data at the second compression rate is a binary image, and the computer processing unit determines that the information contained in the at least one part of the check image is not reproducible at the second compression rate when a threshold value for obtaining the binary image cannot be determined.

22. A method for processing check payment transaction, comprising:
   using a scanner to capture at a first compression rate image data representing at least one part of a check received from a customer;
   using a computer processing unit to evaluate, based on the image data captured at the first compression rate, whether information contained in the at least one part of the check can be reproduced by image data at a second compression rate that is greater than the first compression rate; and performing one of the following:
      capturing at the second compression rate image data representing at least the at least one part of the check when is determined by the evaluating step that the information contained in the at least one part of the check is reproducible at the second compression rate, and then storing the check image data captured at the second compression rate for processing the check payment transaction electronically, or
      storing the check image data captured at the first compression rate for processing the check payment transaction electronically when it is determined by the evaluating step that the information contained in the at least one part of the check is not reproducible.

23. The check processing method as described in claim 22, wherein the image data at the first compression rate is image data containing a first number of gradations, and the image data at the second compression rate is image data containing a second number of gradations that is less than the first number of gradations.

24. The check processing method as described in claim 23, wherein the image data at the second compression rate is a binary image, and wherein the evaluating step includes determining a threshold value for obtaining the binary image, and determining that the information contained in the at least one part of the check image is not reproducible at the second compression rate when the threshold value cannot be determined.

25. The check processing method as described in claim 22, wherein the image data at the second compression rate is obtained by converting image data captured at the first compression rate to image data at the second compression rate.

26. An apparatus for processing a check, comprising:
   a scanner configured to scan a check inserted in the apparatus and to capture image data of scanned check at a first compression rate and at a second compression rate that is greater than the first compression rate;
   a computer processing unit configured to determine, based on check image data at the first compression rate, whether information contained in at least one part of the check is reproducible by image data at the second compression rate; and
   a storage device configured to store check image data captured at the second compression rate when the computer processing unit determines that the information contained in the at least one part of the check is reproducible at the second compression rate, and configured to store check image data captured at the first compression rate when the computer processing unit determines that the information contained in the at least one part of the check is not reproducible at the second compression rate.

27. The check processing apparatus as described in claim 26, wherein the scanner converts image data captured at the first compression rate to image data at the second compression rate.

28. The check processing apparatus as described in claim 26, wherein the image data at the first compression rate is image data containing a first number of gradations, and the image data at the second compression rate is image data containing a second number of gradations that is less than the first number of gradations.

29. The check processing apparatus as described in claim 28, wherein the image data at the second compression rate is a binary image, and the computer processing unit determines that the information contained in the at least one part of the check image is not reproducible at the second compression rate when a threshold value for obtaining the binary image cannot be determined.

* * * * *

UNITED STATES PATENT AND TRADEMARK OFFICE
CERTIFICATE OF CORRECTION

PATENT NO.       : 7,584,148 B2
APPLICATION NO.  : 10/293586
DATED            : September 1, 2009
INVENTOR(S)      : Omura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1989 days.

Signed and Sealed this

Fourteenth Day of September, 2010

David J. Kappos
*Director of the United States Patent and Trademark Office*